United States Patent [19]
Hanson

[11] Patent Number: 5,359,185
[45] Date of Patent: Oct. 25, 1994

[54] CHROMATIC RANGING METHOD AND APPARATUS FOR READING OPTICALLY READABLE INFORMATION OVER A SUBSTANTIAL RANGE OF DISTANCES

[75] Inventor: George E. Hanson, Cedar Rapids, Iowa

[73] Assignee: Norand Corporation, Cedar Rapids, Iowa

[21] Appl. No.: 945,174

[22] Filed: Sep. 14, 1992

Related U.S. Application Data

[63] Continuation-in-part of Ser. No. 913,693, Jul. 14, 1992, abandoned, and a continuation-in-part of Ser. No. 881,096, May 11, 1992, abandoned.

[51] Int. Cl.$^5$ ............................................. G06K 7/10
[52] U.S. Cl. .................................. 235/472; 235/465; 235/469; 235/462
[58] Field of Search ............... 235/462, 465, 472, 469; 250/566

[56] References Cited

U.S. PATENT DOCUMENTS 4,818,886  4/1989  Drucker ........................ 235/472

Primary Examiner—Harold Pitts
Attorney, Agent, or Firm—Suiter & Associates

[57] ABSTRACT

An improved method and apparatus for reading optical information over a substantial range of distances provides an optical string, disposed in a housing, for refracting images of optical information of varying wavelengths to different focal points along a longitudinal axis at a predetermined reading position. Adjacent the housing, and directed along the longitudinal axis of a housing opening and the optical string, is an illumination source for illuminating optical information with light. Also included is a reading sensor having a light receiving plane disposed at a predetermined reading position behind the optical string for converting an image of optical information into an electrical signal. A control system is also provided for determining and decoding the reflected light image formed by that wavelength of light received from the illumination source which produces the best focus on the light receiving plane of the reading sensor. Finally, an apparatus is also provided for producing a digital information set corresponding to the image of optical information focused by the optical string onto the receiving plane of the reading sensor.

9 Claims, 9 Drawing Sheets

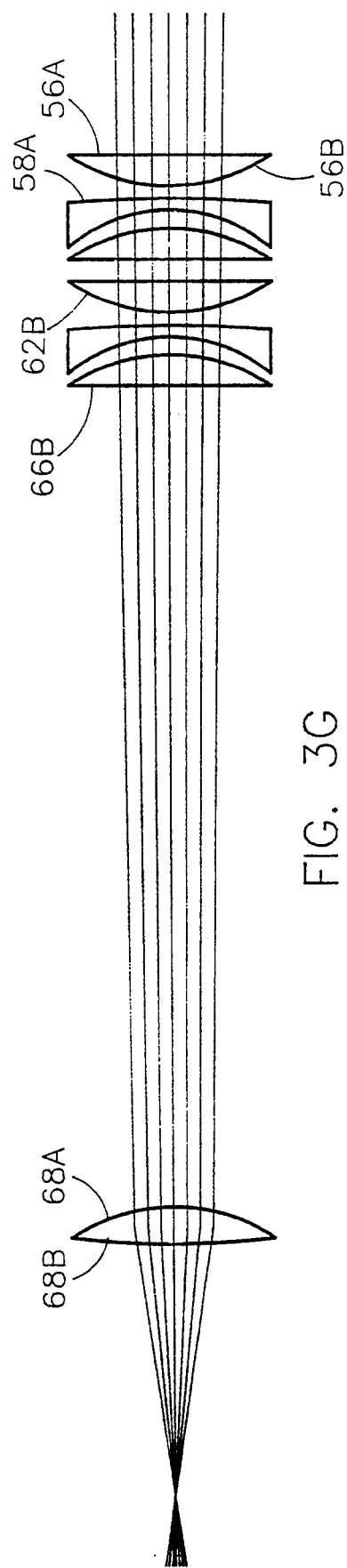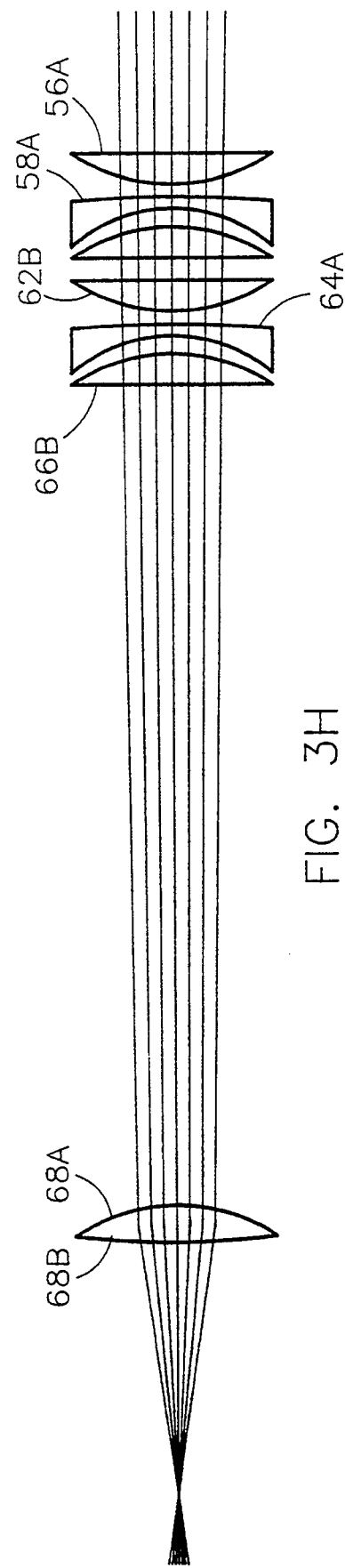
FIG. 3G
FIG. 3H

CHROMATIC RANGING METHOD AND APPARATUS FOR READING OPTICALLY READABLE INFORMATION OVER A SUBSTANTIAL RANGE OF DISTANCES

CROSS REFERENCES TO RELATED APPLICATIONS

The present application is a continuation-in-part of the following copending applications:

| U.S. Ser. No | Filing Date | Inventor | Docket No |
| --- | --- | --- | --- |
| 07/913,693 | 14 July 1992 | G. E. Hanson | Now Abandoned |
| 07/881,096 | 11 May 1992 | G. E. Hanson | Now Abandoned |

This application is also related to PCT International application PCT/US92/06156, filed Jul. 23, 1992, naming G. E. Hanson as inventor, and designating the Contracting States of the European Patent Convention, Canada, Germany, Spain, and the United Kingdom.

TECHNICAL FIELD

The present invention is directed generally to an improved ranging method and apparatus for reading optically readable information over a substantial range of distances, and more particularly to such a method and apparatus wherein an optical string having an enhanced longitudinal axial chromatic aberration and illumination source for sequentially illuminating optically readable information with light of varying wavelengths are utilized.

BACKGROUND ART

Many industries designate their products with optically readable information. Optically readable information often takes the form of a bar code symbol consisting of a series of lines and spaces of varying widths. Various bar code readers and laser scanning systems have been employed to decode such symbol patterns. One of the many problems encountered in the bar code reader art, wherein a photosensitive array are utilized, is to produce an optical system capable of focusing images of optically readable information where such information lies at varying distances from the reader.

Known to the art are readers which utilize mechanical means to change the focal length of an optical system. Although such mechanical means may be employed to read optical information over a substantial range of distances, such means are often somewhat cumbersome in design, temperamental, expensive, and require the expenditure of additional battery energy. Thus, in the hand-held optical information reader art, where power consumption, weight, portability, convenience, range, and depth-of-field are of great concern, means for obviating and simplifying focusing requirements have long been sought.

Therefore, it is a principal object of the present invention to provide a method and apparatus for focusing an image of optical information over a substantial range of distances which requires no moving parts, is convenient, easy to use and simple in construction.

Another object of the present invention is to provide a method and apparatus for focusing an image of optical information over a substantial range of distances which is compact in design.

DISCLOSURE OF THE INVENTION

The present invention, in a simple form, includes a lens system having an enhanced longitudinal axial chromatic aberration. This lens system may be protected within a housing and situated within or behind an opening in the housing. A reading sensor, having a light receiving plane, may then be fixed behind the lens system, in a plane transverse to the longitudinal axis of the lens system, and generally parallel to any optical surface of the lens system.

An apparatus for sequentially illuminating optical information with light of varying wavelengths may then be mounted such that an area in front of the housing opening may be sequentially illuminated with light of varying wavelengths. The housing opening and the illumination apparatus may then be directed at optical information such that light of sequentially varying wavelengths is reflected from the optical information. In this fashion, a reflected light image of the optical information is created in sequentially varying wavelengths and is refracted by the lens system such that a sequential series of images of varying wavelengths of the optical information is incident on the light receiving plane of the reading sensor.

A data set of each varying wavelength image may then be created, and for example, decode attempts may be made by a processor until such time as an image of sufficient focus is found and decoded.

As a further aspect of the present invention a white light illumination source (or ambient light), prism, and an inclined photosensitive array may also be utilized. In this fashion the reflected light image of optically readable information may be split by the prism into component visible light wavelengths such that a series of images are formed on the surface of the inclined photosensitive array. Computer means may then be utilized to process that reflected light image which provides the highest contrast, thus, providing means for reading optically readable information sets over a substantial range of distances.

BRIEF DESCRIPTION OF THE DRAWINGS

FIGS. 3A through 3H are highly diagrammatic illustrations showing the general range and operation of an exemplary embodiment wherein optically readable information is sequentially illuminated under light having a wavelength of 480, 569, 585, 608, 626, 640, 660, and 697 nm, respectively.

BEST MODE FOR CARRYING OUT THE INVENTION

1. Description of a First Exemplary Apparatus

It has long been known that the index of refraction of an optical element varies as a function of the wavelength of light. In general, the index of refraction of optical materials is higher for shorter wavelengths than for longer wavelengths. Thus, short wavelengths are refracted more at each surface of an optical element so that in a simple positive (converging) lens blue light rays are brought to focus closer to the lens than red light rays. The distance along the axis between the two focus points in known as longitudinal axial chromatic aberration.

Uncorrected longitudinal axial chromatic aberration causes an axial point to appear as a central bright dot surrounded by a halo. The light rays which are in focus, or nearly in focus, form the bright dot image, and the out-of-focus rays form the halo image. Therefore, in an uncorrected or under corrected visual instrument, an axial point image appears as a yellowish dot (formed by orange, yellow, and green rays) with a purplish halo (formed by red and blue rays). If the screen on which such an image has been formed is moved nearer the lens, the central dot image becomes blue, conversely, if the screen is moved away, the central dot image becomes red.

Figure 1:
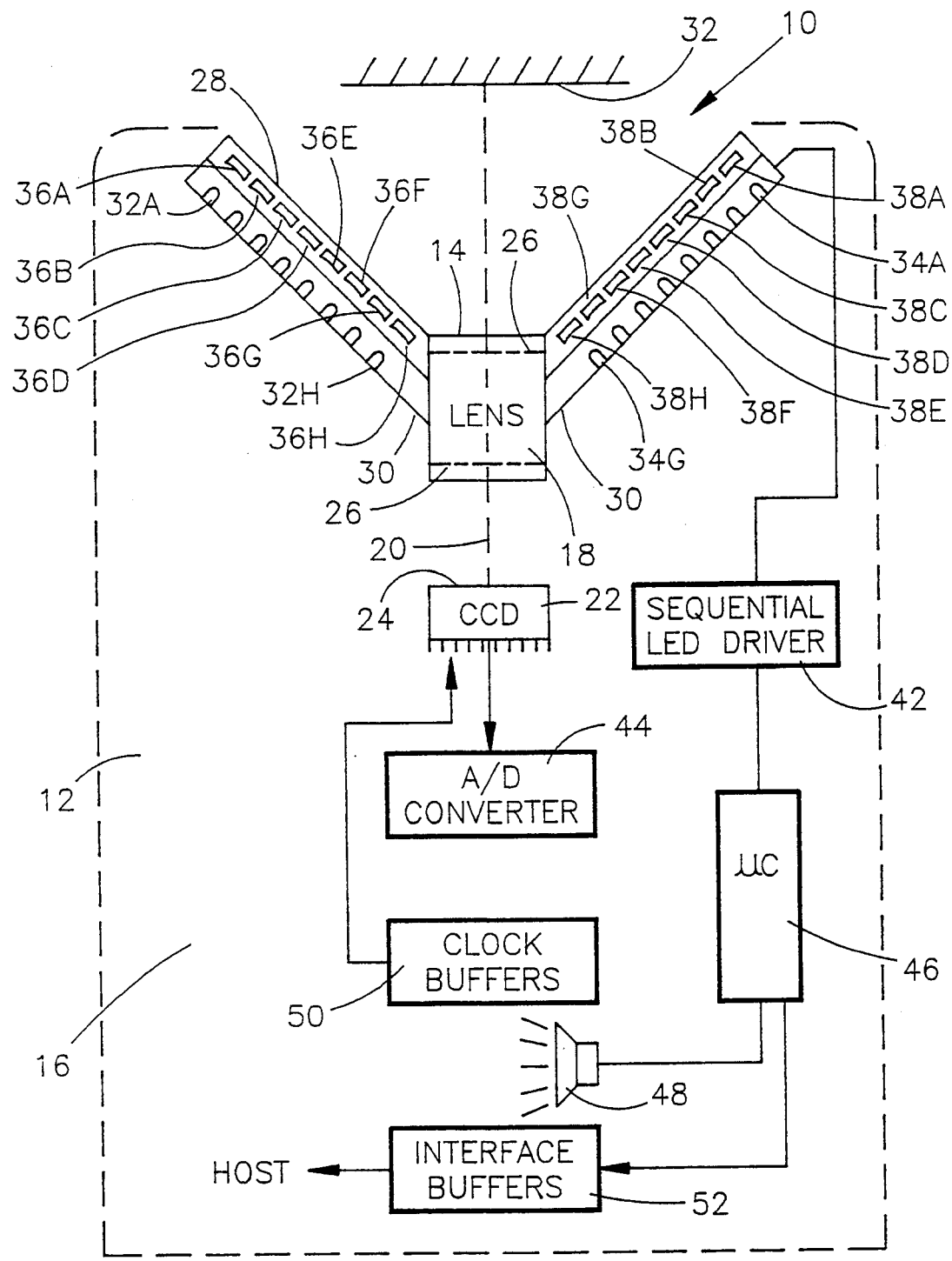
FIG. 1 is a schema diagrammatically illustrating the construction of an exemplary embodiment of an apparatus for reading optically readable information over a substantial range of distances.

The present invention utilizes an optical string having an enhanced longitudinal axial chromatic aberration and an illumination source for sequentially illuminating optically readable information with light of varying wavelengths. In an exemplary embodiment 10 of the present invention, as best illustrated by FIG. 1, a housing 12, having a size and weight to be handheld, includes an aperture 14 and a central cavity 16. Mounted in the housing cavity 16 is an optical string 18 having its optical axis 20 directed forwardly through the housing aperture 14 such that light from outside the housing 12 may enter the housing cavity 16 through the housing aperture 14 and optical string 18 (FIG. 1).

Also mounted within the housing cavity 16, for example, is a photosensitive array 22 such as a CCD sensor array. This array 22 has a light receiving plane 24 which is situated transverse to the optical axis 20 of the optical string 18 and generally parallel to the principal planes 26 of at least one of the optical elements (FIG. 1). In this fashion light entering the housing aperture 14 passes through the optical string 18 and becomes incident on the light receiving plane 24 of the array 22. The array 22 is adapted to produce electrical signals corresponding to the images incident upon the light receiving plane 24 of the array 22. The image conjugate distance ($s_1$), i.e., the optical string 18 to light receiving plane 24 distance (FIG. 1), is fixed in this exemplary embodiment 10.

Illumination means 28 is mounted on the front portion of the housing 30 such that light projected from the illumination means 28 may be reflected from optically readable information 32 at a distance from the front portion 30 and generally parallel to the principal planes 26 of at least one of the optical elements. The illumination means 28 consists essentially, in an exemplary embodiment 10, of a first pair of a plurality of light emitting diodes (LED's) (32A-32H) and a second pair of a plurality of LED's (34A-34H). Each LED (32A-32H, 34A-34H) may be mounted behind a diffusion lens (36A-36H, 38A-38H) such that light from any particular pair of LED's, e.g., 32A and 34A, 32B and 34B, 32C and 34C, . . . or 32H and 34H, illuminate a given area in different generally parallel planes 40A-40H located at different distances ($s_2$) from and in front of the optical string 18 (FIG. 3 and 4, et al.).

Each pair of LED's emits a discrete wavelength of light. For example, 32A-34A may emit light having a wavelength of 480 nm, 32B-34B may emit light having a wavelength of 569 nm, 32C-34C may emit light having a wavelength of 585 nm, 32D-34D may emit light having a wavelength of 608 nm, 32E-34E may emit light having a wavelength of 626 nm, 32F-34F may emit light having a wavelength of 640 nm, 32G-34G may emit light having a wavelength of 660 nm, and 32H-34H may emit light having a wavelength of 697 nm. In order that optically readable information located generally within these generally parallel planes 40A-40H may be read, over a substantial range of distances (given by $S_{2H}-S_{2A}$), the illumination means 28 includes control means 42 for sequentially turning on and off each identical wavelength pair of LED's, i.e., 32A and 34A, 32B and 34B, 32C and 34C, . . . and then 32H and 34H.

In this fashion, an operator of an exemplary embodiment 10 of the present invention may grasp the housing 12, in one of their hands, and direct the housing aperture 14, within a given range of distances, at an optically readable information carrier. The operator may then activate the illumination means 28 such that the optically readable information is sequentially illuminated by light of varying wavelengths. As the image produced by each wavelength of light becomes incident on the receiving plane 24 of the array 22 an electrical signal corresponding to the image is produced by the array 22, and analog-to-digital converter 44, whereupon the microprocessor 46 attempts to decode the image of the optically readable information. If the operator has the apparatus 10 within ranging limits at least one of the discrete wavelength images of the optically readable information will produce a focused and decodable optically readable information image. Once the bar code has been decoded the operator may be notified by notification means 48 such as a tone or light signal and the apparatus 10 may be powered down, by the microprocessor 44, in order to conserve battery power, or the like. Clock 50 and interface 52 buffers may also be included.

2. Description of an Exemplary Lens System

The ratio of the velocity of light in a vacuum to the velocity of light in a particular medium is known as the Index of Refraction. The Dispersion of an optical material is enumerated by an Abbe number. For a particular optical material the index of refraction and dispersion are generally defined by one six digit number. The first three digits divided by 1000 plus 1 gives the refractive index and the last three digits provide information regarding the materials dispersive properties. The Abbe number (vd) is defined as follows:

$$vd = (nd-1)/(nf-nc),$$

where nd equals the refractive index at the yellow helium line (587.5618 nm), nf equals the refractive index at the blue hydrogen line (486.1327 nm), and nc equals the refractive index at the red hydrogen line (656.2725 nm). The Abbe number (ve) is defined as follows:

$$ve = (ne-1)/(nf'-nc'),$$

where ne equals the refractive index at the green mercury line (546.0740 nm), nf' equals the refractive index at the blue cadmium line (479.9914 nm), and nc' equals the refractive index at the red cadmium line (643.8469 nm). The magnitude of the Abbe number identifies the variation in the index of refraction over wavelength, and is an indication of how pronounced the chromatic dispersion of an optical element made from such a material will be. To more precisely define an index at a given frequency, then, the following equation must be used:

$$n^2 = (A_0 + (A_1 * \lambda^2)) + (A_2 * \lambda^{-2}) + (A_3 * \lambda^{-4}) + (A_4 * \lambda^{-6}) + (A_5 * \lambda^{-8})$$

where n equals the refractive index, $A_0$, $A_1$, $A_2$, $A_3$, $A_4$, and $A_5$ equal constants tabulated by glass type and calculated by a high order regression analysis.

In order to design an optical string having an enhanced longitudinal axial chromatic aberration we will require an understanding of the following additional expressions:

$$1/f = (n-1)*((1/r_1) - (1/r_2)) + ((n-1)^2)/n)*(tc/r_1 * r_2),$$

where n equals the appropriate refractive index, $r_1$ equals the radius of curvature of surface one, $r_2$ equals the radius of curvature of surface two, $f$ equals the lens focal length, and tc equals the lens center thickness. This equation provides a means for defining a focal length based upon a few measurable physical parameters of the lens.

The second equation, known as the thin lens formula, follows:

$$(1/f) = (1/s1) + (1/s2),$$

where $f$ equals the lens focal length, $s_1$ equals the image conjugate distance, and $s_2$ equals the object conjugate distance.

With a focal length defined for the lens based upon a wavelength specific index of refraction, it is possible to identify the relationship between the conjugate distances. The variable $s_1$ is the lens to sensor distance. The variable $s_2$ is the code to lens distance. Since we require the image conjugate distance ($s_1$) to be fixed in our exemplary embodiment (FIGS. 3 and 4, et al.), a variation in $f$ forces the object conjugate distance ($s_2$) to vary.

In an exemplary embodiment of the present invention 10 an optical string 18 having an enhanced longitudinal chromatic aberration is provided. The lens of this exemplary embodiment has two triplets and 15 surfaces including the light receiving plane 24 of the CCD array 22. This optical string 18 provides a range of between >3.620 and <6.000 inches including the corresponding depth-of-field at each wavelength of illumination. The following tables provide physical characteristics of the optical string 18 at varying wavelengths.

TABLE 1

| 15 Surface Optical String Characteristics at λ Equals 480 nm | | | | |
|---|---|---|---|---|
| INDEX | Zvx | CURV-ATURE | SURFACE | DIAMETER |
| 1.00 | 152.4 | 0.0000000 | lens | 12.744 mm |
| 1.435451 | 153.9 | −0.0700000 | lens | " |
| 1.0 | 154.7 | 0.0310000 | lens | " |
| 1.988999 | 155.2 | 0.0951000 | lens | " |
| 1.00 | 156.0 | 0.0700000 | lens | " |
| 1.435451 | 157.5 | 0.0000000 | lens | " |
| 1.00 | 159.0 | 0.0000000 | lens | " |
| 1.435451 | 160.5 | −0.0700000 | lens | " |
| 1.00 | 161.3 | 0.0310000 | lens | " |
| 1.988999 | 161.8 | 0.0951000 | lens | " |
| 1.00 | 162.6 | 0.0700000 | lens | " |
| 1.435451 | 164.1 | 0.0000000 | lens | " |
| 1.00 | 214.1 | 0.0617000 | lens | " |
| 1.435451 | 216.0 | −0.0240000 | lens | " |
| 1.00 | 245.9058 | n/a | CCD | >12.744 mm |

SF-59 glass has an index of refraction of 1.988999099 at 480 nm. FK-54 glass has an index of refraction of 1.440608390 at 480 nm. The focal length for this exemplary string is set at 25.00 mm by iterative adjustment of the last two curvatures. The spacing between this lens and the lens triplet is set at 50.00 min. This geometry is identical to the geometry of the 660 nm optical data set (Table 7). The focal length differs due to longitudinal axial chromatic aberration.

TABLE 2

| 15 Surface Optical String Characteristics at λ Equals 569 nm | | | | |
|---|---|---|---|---|
| INDEX | Zvx | CURV-ATURE | SURFACE | DIAMETER |
| 1.00 | 152.4 | 0.0000000 | lens | 12.744 mm |
| 1.437486 | 153.9 | −0.0700000 | lens | " |
| 1.0 | 154.7 | 0.0310000 | lens | " |
| 1.957063 | 155.2 | 0.0951000 | lens | " |
| 1.00 | 156.0 | 0.0700000 | lens | " |
| 1.437486 | 157.5 | 0.0000000 | lens | " |
| 1.00 | 159.0 | 0.0000000 | lens | " |
| 1.437486 | 160.5 | −0.0700000 | lens | " |
| 1.00 | 161.3 | 0.0310000 | lens | " |
| 1.957063 | 161.8 | 0.0951000 | lens | " |
| 1.00 | 162.6 | 0.0700000 | lens | " |
| 1.437486 | 164.1 | 0.0000000 | lens | " |
| 1.00 | 214.1 | 0.0617000 | lens | " |
| 1.437486 | 216.0 | −0.0240000 | lens | " |
| 1.00 | 243.5363 | 0.0000000 | CCD | >12.744 mm |

SF-59 glass has an index of refraction of 1.957063189 at 569 nm. FK-54 glass has an index of refraction of 1.437485899 at 569 nm. This geometry is identical to the 480 nm data set but the lens indices are different due to dispersion. The effective focal length of this optical string at this wavelength is 23.3223 min.

TABLE 3

| 15 Surface Optical String Characteristics at λ Equals 585 nm | | | | |
|---|---|---|---|---|
| INDEX | Zvx | CURV-ATURE | SURFACE | DIAMETER |
| 1.00 | 152.4 | 0.0000000 | lens | 12.744 mm |
| 1.437065 | 153.9 | −0.0700000 | lens | " |
| 1.0 | 154.7 | 0.0310000 | lens | " |
| 1.953097 | 155.2 | 0.0951000 | lens | " |
| 1.00 | 156.0 | 0.0700000 | lens | " |
| 1.437065 | 157.5 | 0.0000000 | lens | " |
| 1.00 | 159.0 | 0.0000000 | lens | " |
| 1.437065 | 160.5 | −0.0700000 | lens | " |
| 1.00 | 161.3 | 0.0310000 | lens | " |
| 1.953097 | 161.8 | 0.0951000 | lens | " |
| 1.00 | 162.6 | 0.0700000 | lens | " |
| 1.437065 | 164.1 | 0.0000000 | lens | " |

TABLE 3-continued

15 Surface Optical String Characteristics at λ Equals 585 nm

| INDEX | Zvx | CURV-ATURE | SURFACE | DIAMETER |
|---|---|---|---|---|
| 1.00 | 214.1 | 0.0617000 | lens | " |
| 1.437065 | 216.0 | −0.0240000 | lens | " |
| 1.00 | 243.3410 | 0.0000000 | CCD | >12.744 mm |

SF-59 glass has an index of refraction of 1.953096949 at 585 nm. FK-54 glass has an index of refraction of 1.437064655 at 585 nm. This geometry is identical to the 480 nm data set but the lens indices are different due to dispersion. The effective focal length of this optical string at this wavelength is 23.1821 min.

TABLE 4

15 Surface Optical String Characteristics at λ Equals 608 nm

| INDEX | Zvx | CURV-ATURE | SURFACE | DIAMETER |
|---|---|---|---|---|
| 1.00 | 152.4 | 0.0000000 | lens | 12.744 mm |
| 1.436512 | 153.9 | −0.0700000 | lens | " |
| 1.0 | 154.7 | 0.0310000 | lens | " |
| 1.948022 | 155.2 | 0.0951000 | lens | " |
| 1.00 | 156.0 | 0.0700000 | lens | " |
| 1.436512 | 157.5 | 0.0000000 | lens | " |
| 1.00 | 159.0 | 0.0000000 | lens | " |
| 1.436512 | 160.5 | −0.0700000 | lens | " |
| 1.00 | 161.3 | 0.0310000 | lens | " |
| 1.948022 | 161.8 | 0.0951000 | lens | " |
| 1.00 | 162.6 | 0.0700000 | lens | " |
| 1.436512 | 164.1 | 0.0000000 | lens | " |
| 1.00 | 214.1 | 0.0617000 | lens | " |
| 1.436512 | 216.0 | −0.0240000 | lens | " |
| 1.00 | 243.0857 | 0.0000000 | CCD | >12.744 mm |

SF-59 glass has an index of refraction of 1.948022358 at 608 nm. FK-54 glass has an index of refraction of 1.436512317 at 608 nm. This geometry is identical to the 480 nm data set but the lens indices are different due to dispersion. The effective focal length of this lens string at this wavelength is 22.9983 min.

TABLE 5

15 Surface Optical String Characteristics at λ Equals 626 nm

| INDEX | Zvx | CURV-ATURE | SURFACE | DIAMETER |
|---|---|---|---|---|
| 1.00 | 152.4 | 0.0000000 | lens | 12.744 mm |
| 1.436118 | 153.9 | −0.0700000 | lens | " |
| 1.0 | 154.7 | 0.0310000 | lens | " |
| 1.944492 | 155.2 | 0.0951000 | lens | " |
| 1.00 | 156.0 | 0.0700000 | lens | " |
| 1.436118 | 157.5 | 0.0000000 | lens | " |
| 1.00 | 159.0 | 0.0000000 | lens | " |
| 1.436118 | 160.5 | −0.0700000 | lens | " |
| 1.00 | 161.3 | 0.0310000 | lens | " |
| 1.944492 | 161.8 | 0.0951000 | lens | " |
| 1.00 | 162.6 | 0.0700000 | lens | " |
| 1.436118 | 164.1 | 0.0000000 | lens | " |
| 1.00 | 214.1 | 0.0617000 | lens | " |
| 1.436118 | 216.0 | −0.0240000 | lens | " |
| 1.00 | 242.9044 | 0.0000000 | CCD | >12.744 mm |

SF-59 glass has an index of refraction of 1.944491956 at 626 nm. FK-54 glass has an index of refraction of 1.436118253 at 626 nm. This geometry is identical to the 480 nm data set but the lens indices are different due to dispersion. The effective focal length of this optical string at this wavelength is 22.8674 min.

TABLE 6

15 Surface Optical String Characteristics at λ Equals 640 nm

| INDEX | Zvx | CURV-ATURE | SURFACE | DIAMETER |
|---|---|---|---|---|
| 1.00 | 152.4 | 0.0000000 | lens | 12.744 mm |
| 1.435832 | 153.9 | −0.0700000 | lens | " |
| 1.0 | 154.7 | 0.0310000 | lens | " |
| 1.941977 | 155.2 | 0.0951000 | lens | " |
| 1.00 | 156.0 | 0.0700000 | lens | " |
| 1.435832 | 157.5 | 0.0000000 | lens | " |
| 1.00 | 159.0 | 0.0000000 | lens | " |
| 1.435832 | 160.5 | −0.0700000 | lens | " |
| 1.00 | 161.3 | 0.0310000 | lens | " |
| 1.941977 | 161.8 | 0.0951000 | lens | " |
| 1.00 | 162.6 | 0.0700000 | lens | " |
| 1.435832 | 164.1 | 0.0000000 | lens | " |
| 1.00 | 214.1 | 0.0617000 | lens | " |
| 1.435832 | 216.0 | −0.0240000 | lens | " |
| 1.00 | 242.7736 | 0.0000000 | CCD | >12.744 mm |

SF-59 glass has an index of refraction of 1.941977424 at 608 nm. FK-54 glass has an index of refraction of 1.435832149 at 608 nm. This geometry is identical to the 480 nm data set but the lens indices are different due to dispersion. The effective focal length of this lens string at this wavelength is 22.7729 min.

TABLE 7

15 Surface Optical String Characteristics at λ Equals 660 nm

| INDEX | Zvx | CURV-ATURE | SURFACE | DIAMETER |
|---|---|---|---|---|
| 1.00 | 152.4 | 0.0000000 | lens | 12.744 mm |
| 1.435451 | 153.9 | −0.0700000 | lens | " |
| 1.0 | 154.7 | 0.0310000 | lens | " |
| 1.938693 | 155.2 | 0.0951000 | lens | " |
| 1.00 | 156.0 | 0.0700000 | lens | " |
| 1.435451 | 157.5 | 0.0000000 | lens | " |
| 1.00 | 159.0 | 0.0000000 | lens | " |
| 1.435451 | 160.5 | −0.0700000 | lens | " |
| 1.00 | 161.3 | 0.0310000 | lens | " |
| 1.938693 | 161.8 | 0.0951000 | lens | " |
| 1.00 | 162.6 | 0.0700000 | lens | " |
| 1.435451 | 164.1 | 0.0000000 | lens | " |
| 1.00 | 214.1 | 0.0617000 | lens | " |
| 1.435451 | 216.0 | −0.0240000 | lens | " |
| 1.00 | 242.6010 | 0.0000000 | CCD | >12.744 mm |

SF-59 glass has an index of refraction of 1.938693038 at 608 nm. FK-54 glass has an index of refraction of 1.435450943 at 608 nm. This geometry is identical to the 480 nm data set but the lens indices are different due to dispersion. The effective focal length of this lens string at this wavelength is 22.6479 min.

TABLE 8

15 Surface Optical String Characteristics at λ Equals 697 nm

| INDEX | Zvx | CURV-ATURE | SURFACE | DIAMETER |
|---|---|---|---|---|
| 1.00 | 152.4 | 0.0000000 | lens | 12.744 mm |
| 1.434819 | 153.9 | −0.0700000 | lens | " |
| 1.0 | 154.7 | 0.0310000 | lens | " |
| 1.933422 | 155.2 | 0.0951000 | lens | " |
| 1.00 | 156.0 | 0.0700000 | lens | " |
| 1.434819 | 157.5 | 0.0000000 | lens | " |
| 1.00 | 159.0 | 0.0000000 | lens | " |
| 1.434819 | 160.5 | −0.0700000 | lens | " |
| 1.00 | 161.3 | 0.0310000 | lens | " |
| 1.933422 | 161.8 | 0.0951000 | lens | " |
| 1.00 | 162.6 | 0.0700000 | lens | " |
| 1.434819 | 164.1 | 0.0000000 | lens | " |
| 1.00 | 214.1 | 0.0617000 | lens | " |
| 1.434819 | 216.0 | −0.0240000 | lens | " |
| 1.00 | 242.3201 | 0.0000000 | CCD | >12.744 mm |

SF-59 glass has an index of refraction of 1.933422175 at 608 nm. FK-54 glass has an index of refraction of 1.434818855 at 608 nm. This geometry is identical to the 480 nm data set but the lens indices are different due to dispersion. The effective focal length of this lens string at this wavelength is 22.4439 min.

Figure 2A:
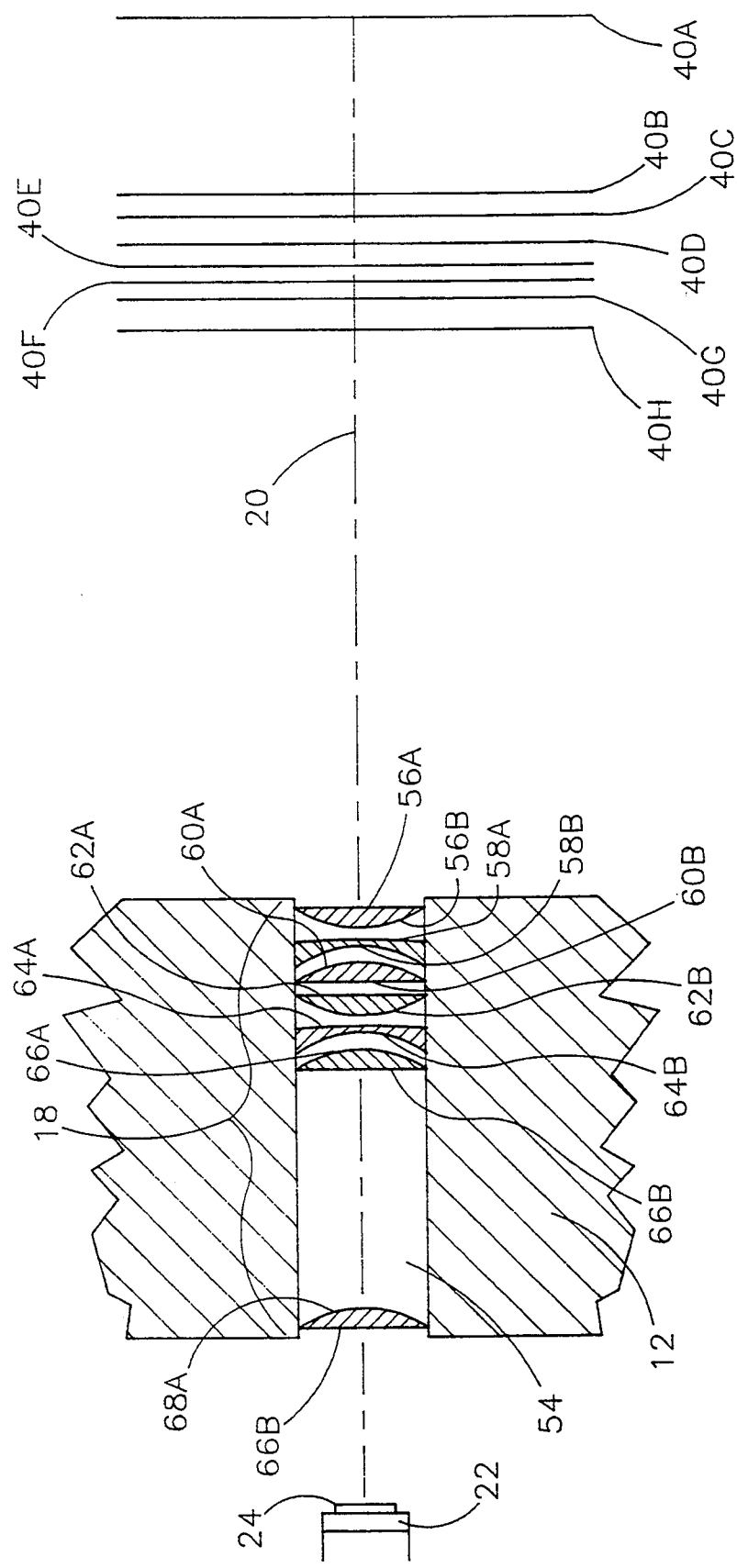
FIG. 2A is a schema diagrammatically illustrating the construction of an exemplary lens for an apparatus for reading optically readable information over a substantial range of distances.
Figure 2B:
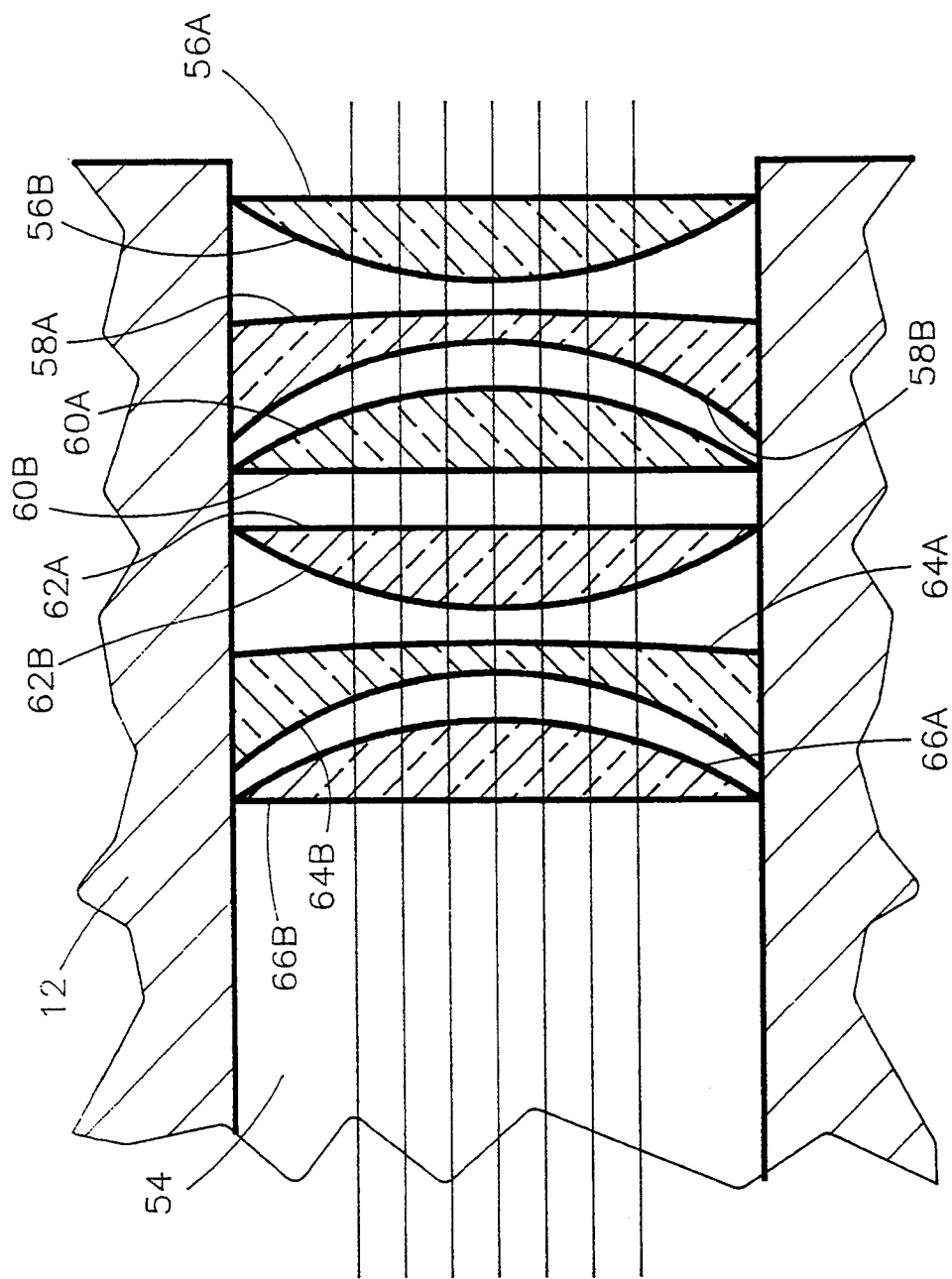
FIG. 2B is a schema diagrammatically illustrating the construction of the two triplets of the exemplary lens of FIG. 2A wherein the ray trajectories through the triplet pairs arc balanced for parallel exit rays at 480 nm.
Figure 3A:
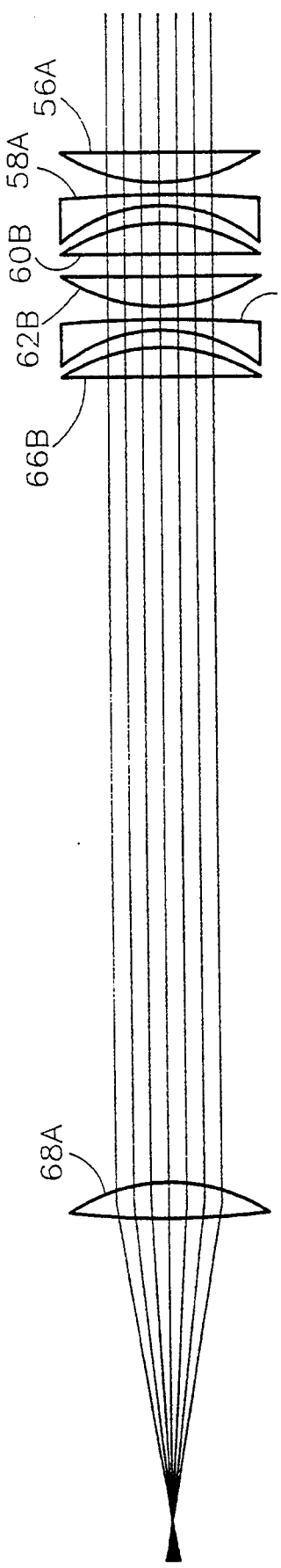
Figure 3B:
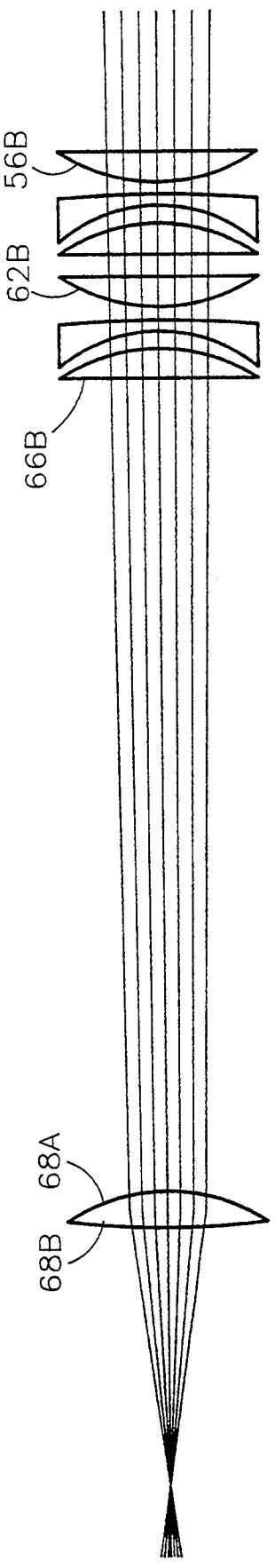
Figure 3C:
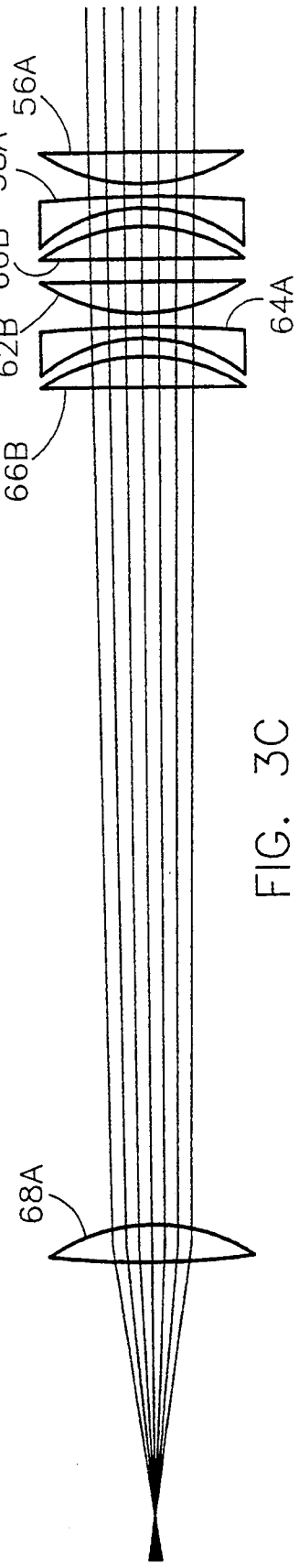
Figure 3D:
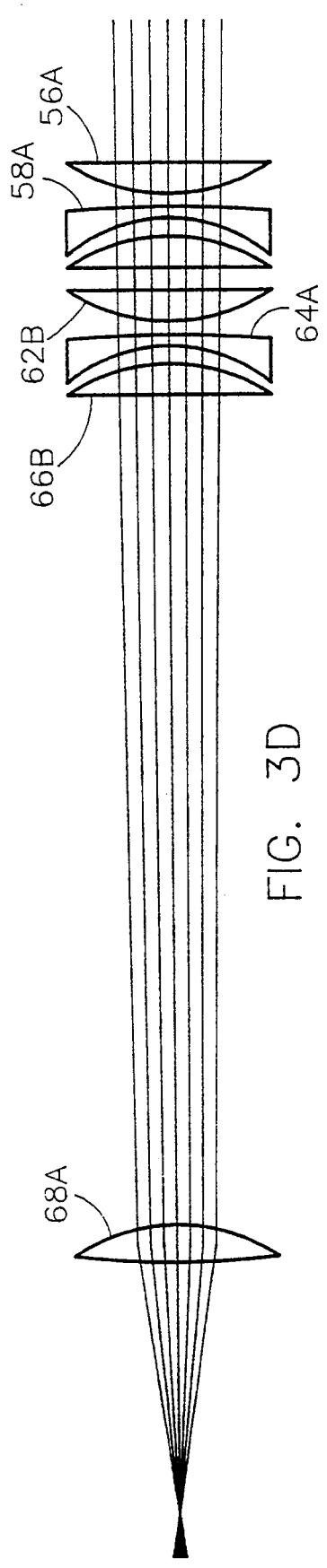
Figure 3E:
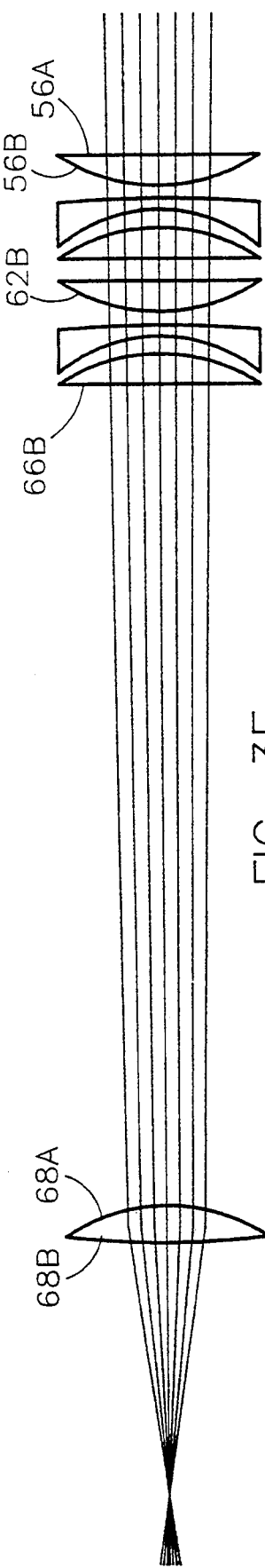
Figure 3F:
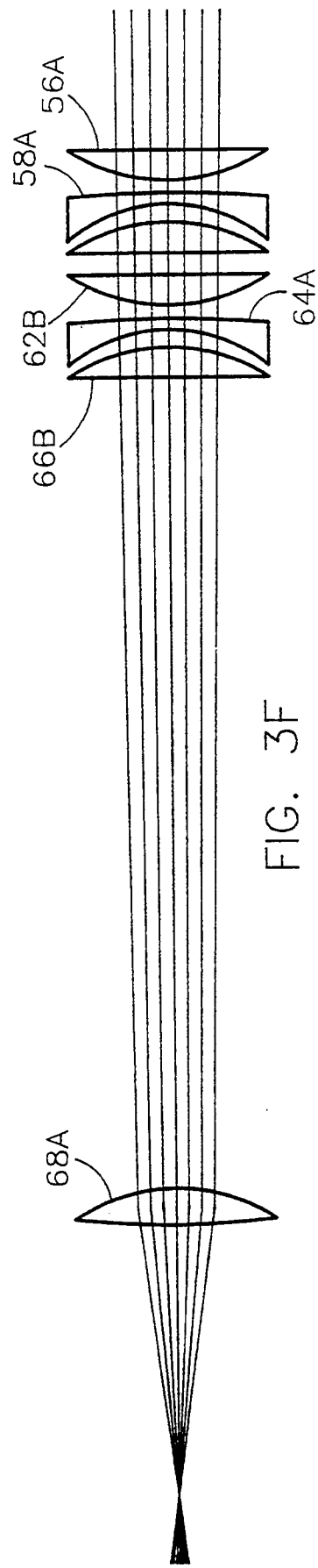

FIG. 2A diagrammatically illustrates an exemplary optical string 18 illustrating lens surface relationships. FIG. 2B illustrates the double triplet lens system having enhanced longitudinal axial chromatic aberration. The double triplet includes lens surfaces 56A-56B, 58A-58B, 60A-60B, 62A-62B, 64A-64B, and 66A-66B. As best illustrated by FIG. 2A, the double triplet trajects light rays to the final lens (surfaces 68A and 68B), whereupon, as best illustrated by FIGS. 3A-3H, the light trajects and becomes incident upon the fifteenth and final surface, i.e., the light receiving plane 24 of the reading sensor array 22.

3. Description of an Exemplary Sequential Illumination Means

Figure 4A:
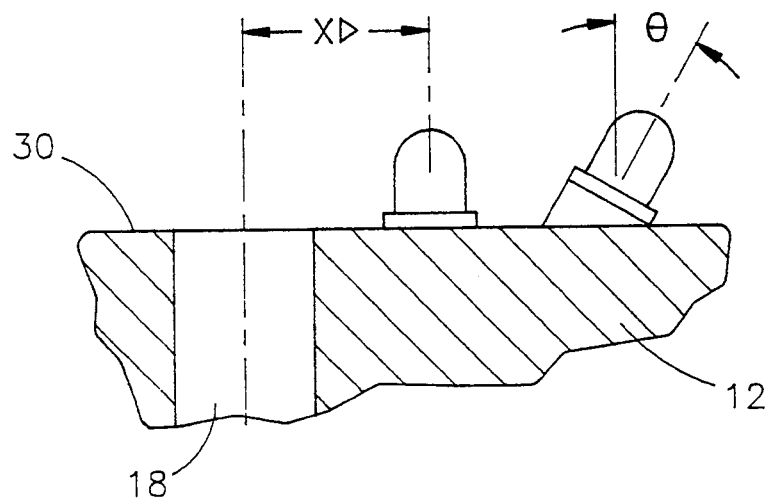
FIGS. 4A and 4B are diagrammatic illustrations of a method of calculating the offset and offset angle of an illumination source in an exemplary embodiment of the present invention.
Figure 4B:
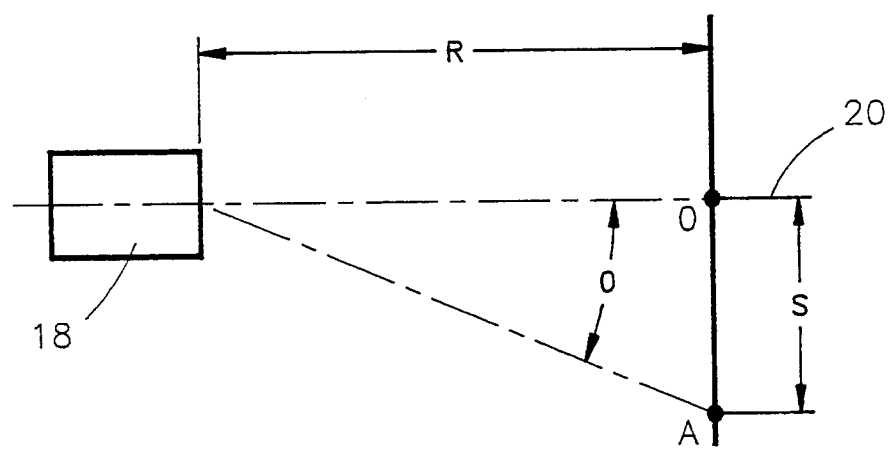
Figure 6:
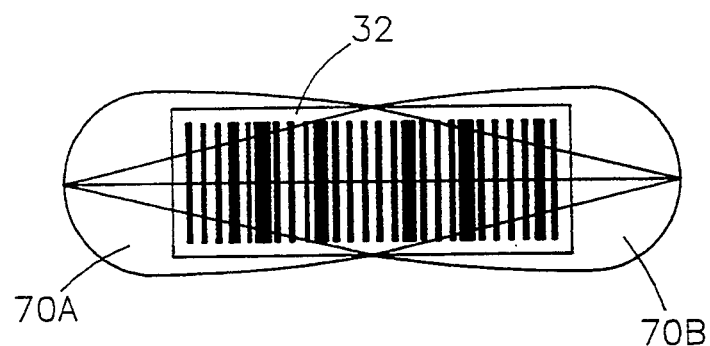
FIG. 6 is a diagrammatic illustrations of a cross-section of the illumination pattern generally produced by a pair of LED's in an exemplary embodiment.
Figure 5:
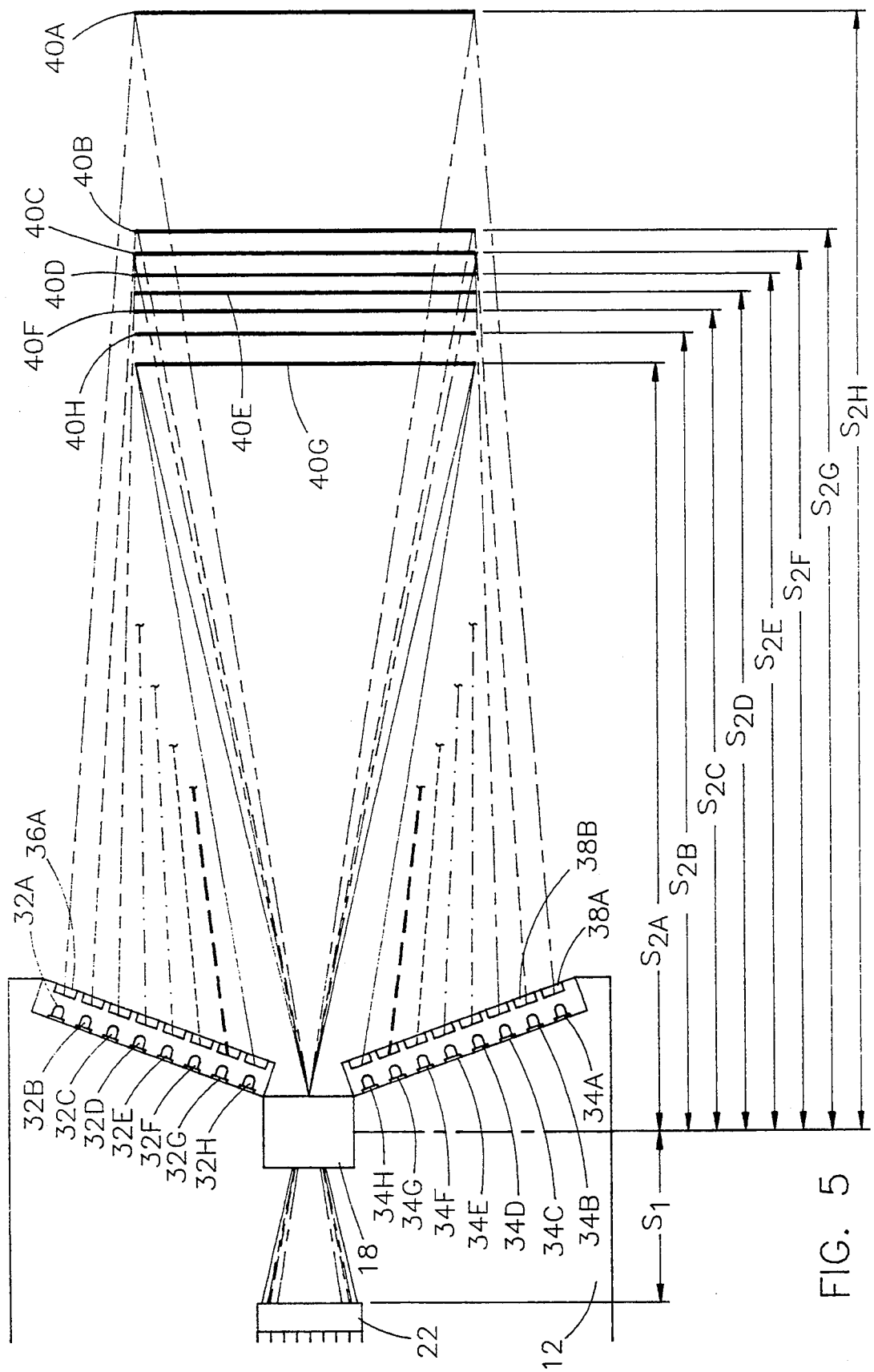
FIG. 5 is a schema diagrammatically illustrating the general range and operation of an exemplary embodiment of an apparatus for reading optically readable information over a substantial range of distances.

As best illustrated by FIGS. 4A and 4B, the illumination source pairs (LED's: 32A-32H, 34A-34H) may be offset a distance x from the optical axis 20 at an angle $\theta$. In this fashion, light from discrete light emitting pairs of diodes may be directed (FIG. 5, 40A-40H) so as to illuminate particular areas in different planes perpendicular to the optical axis 20 (FIG. 6).

4. Description of a Second Exemplary Embodiment

Figure 7:
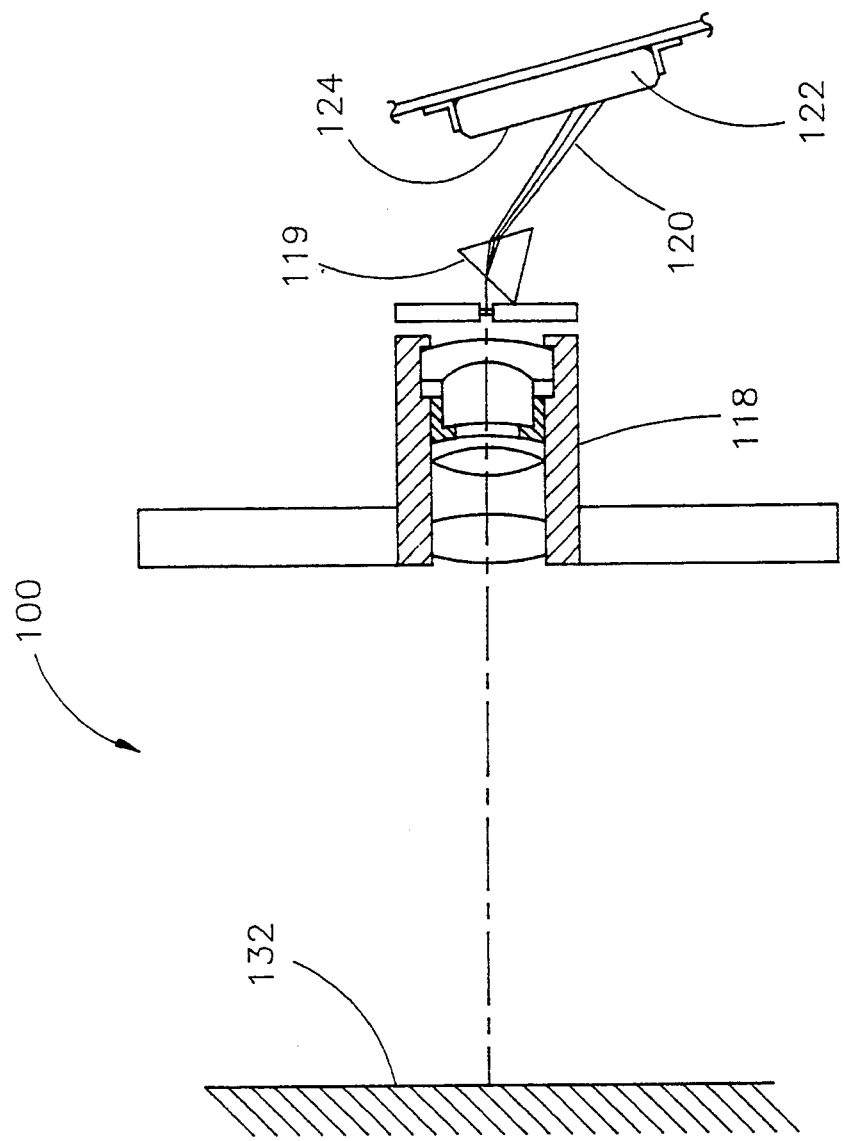
FIG. 7 is a diagrammatic illustration of a second exemplary embodiment wherein a reflected ambient light image of optically readable information is split into its various components by a prism in the light path between the optically readable information before becoming incident on an inclined photosensitive array.

The objects of the present invention may also be accomplished using ambient light as an illumination source. For example, in a second exemplary embodiment 100 a reflected white light image of a bar code 32 or the like may pass through a static optical string 118 before passing through a prism 119 (or other light beam splitting device). The prism 119 causes several images of the bar code, corresponding to the visible wavelengths of light 120 to become incident on the light receiving plane 124 of a two-dimensional photosensitive array 122. As will be observed (FIG. 7) each wavelength of light will produce an image of the optically readable information 132. Such images may be processed such as has been described herein.

I claim:

1. An apparatus for focusing an image of optical information over a substantial range of distances, comprising:
   (a) a housing having an opening for facing optical information;
   (b) optical means, disposed in said housing, for refracting images of optical information of varying wavelengths to different focal points along a longitudinal axis at a predetermined reading position;
   (c) illumination means for sequentially illuminating optical information with light of different wavelengths;
   (d) reading sensor means, disposed at said predetermined reading position and having a light receiving plane, for converting an image of optical information into an electrical signal;
   (e) control means for determining and decoding the reflected light image formed by that wavelength of light from said illumination means which produces the best focus; and
   (f) means for producing a digital information set corresponding to the image of said optical information.

2. The apparatus of claim 1, wherein said optical means has an enhanced longitudinal axial chromatic aberration.

3. The apparatus of claim 2, wherein said optical means includes at least one triplet.

4. The apparatus of claim 3, wherein said optical means comprises at least seven lenses.

5. The apparatus of claim 1, wherein said illumination means includes a plurality of pairs of light sources each pair capable of producing light of a discrete wavelength.

6. The apparatus of claim 5, wherein said light source pairs are light emitting diodes (LED's).

7. The apparatus of claim 5, wherein said light source pairs emit light having a wavelength ranging from 480 nm to 697 nm.

8. The apparatus of claim 1, wherein said reading sensor includes a CCD sensor array.

9. The apparatus of claim 1, wherein said control means includes a microprocessor with associate memory means for storing a processor instruction set.

* * * * *